(12) United States Patent
Pateux et al.

(10) Patent No.: US 8,588,292 B2
(45) Date of Patent: Nov. 19, 2013

(54) METHODS AND DEVICES FOR CODING AND DECODING AN IMAGE SEQUENCE REPRESENTED WITH THE AID OF MOTION TUBES, CORRESPONDING COMPUTER PROGRAM PRODUCTS AND SIGNAL

(75) Inventors: Stéphane Pateux, Rennes (FR); Benjamin Le Guen, Munich (DE); Nathalie Cammas, Sens de Bretagne (FR); Isabelle Amonou, Thorigne Fouillard (FR); Sylvain Kervadec, Sens de Bretagne (FR)

(73) Assignee: France Telecom, Paris (FR)

( * ) Notice: Subject to any disclaimer, the term of this patent is extended or adjusted under 35 U.S.C. 154(b) by 250 days.

(21) Appl. No.: 12/666,184

(22) PCT Filed: Jun. 23, 2008

(86) PCT No.: PCT/FR2008/051126
§ 371 (c)(1),
(2), (4) Date: Dec. 22, 2009

(87) PCT Pub. No.: WO2009/007580
PCT Pub. Date: Jan. 15, 2009

(65) Prior Publication Data
US 2010/0189172 A1     Jul. 29, 2010

(30) Foreign Application Priority Data

Jun. 25, 2007 (FR) ..................................... 07 56007

(51) Int. Cl.
*H04N 7/12* (2006.01)
*H04N 11/02* (2006.01)
*H04N 11/04* (2006.01)

(52) U.S. Cl.
USPC ............ 375/240.01; 375/240.24; 375/240.25; 375/240.26; 348/420.1; 382/233; 382/235

(58) Field of Classification Search
USPC ............ 375/240.1–240.29; 348/420.1, 421.1; 382/233, 235
See application file for complete search history.

(56) References Cited

U.S. PATENT DOCUMENTS 5,923,786 A * 7/1999 Murayama ..................... 382/242
5,936,671 A * 8/1999 Van Beek et al. ........ 375/240.14
(Continued)

FOREIGN PATENT DOCUMENTS

EP      0625853 A2   11/1994
WO      0149036 A1   7/2001

OTHER PUBLICATIONS

Stephane Pechard et al., Video Quality Model Based on a Spatio-Temporal Features Extraction for H.264-Coded HDTV Sequences, 2007, Picture Coding Symposium.*

(Continued)

*Primary Examiner* — Sath V Perungavoor
*Assistant Examiner* — Nathnael Aynalem
(74) *Attorney, Agent, or Firm* — Westman, Champlin & Koehler, P.A.; David D. Brush

(57) ABSTRACT

A method and apparatus are provided for decoding a signal representative of an image sequence. The method includes extracting motion tubes from the signal, each of the tubes being defined by at least the following information cues: a block of reference pixels comprising reference texture information cues; start-of-tube and end-of-tube instants; and transition information cues. The method further includes processing the transition information cues and combining the information cues associated with the current blocks of at least two of the tubes overlapping in an overlap zone of the current image.

15 Claims, 4 Drawing Sheets

(56) References Cited

U.S. PATENT DOCUMENTS

| | | | | |
|---|---|---|---|---|
| 6,990,248 | B2* | 1/2006 | Pardas et al. | 382/243 |
| 7,609,763 | B2* | 10/2009 | Mukerjee et al. | 375/240.16 |
| 7,646,810 | B2* | 1/2010 | Tourapis et al. | 375/240.12 |
| 8,194,184 | B2* | 6/2012 | Turetken et al. | 348/441 |
| 8,194,742 | B2* | 6/2012 | Sekiguchi et al. | 375/240.16 |

OTHER PUBLICATIONS

Heechan Park et al: "Progressive Mesh-Based Motion Estimation Using Partial Refinement" Visual Content Processing and Representation Lecture Notes in Computer Science;; LNCS, Springer-Verlag, BE, vol. 3893, 2006, pp. 92-98, XP019030429 ISBN: 3-540-33578-1 abstract pp. 92-95; figure 2.

Yao Wang et al: "Active Mesh a Feature Seeking and Tracking Image Sequence Representation Scheme" IEEE Transactions on Image Processing, IEEE Service Center, Piscataway, NJ, US, vol. 3, No. 5, Sep. 1, 1994, pp. 610-624, XP000476835 ISSN: 1057-7149.

Hassan Mansour et al: "An Efficient Multiple Description Coding Scheme for the Scalable Extension of H. 264/ AVC (SVC)" Signal Processing and Information Technology, 2006 IEEE International Symposium on, IEEE, PI, Aug. 2006, pp. 519-523, XP031002484 ISBN: 0-7803-9753-3 pp. 520-521.

European Search Report dated Apr. 13, 2011 for corresponding European Application No. 08 806 058.7-2223.

Pechard et al., "A New Methodology to Estimate the Impact of H.264 Artefacts on Subjective Video Quality" International Workshop on Video Processing and Quality Metrics for Consumer Electronics, VPQM, Scottsdale, USA, Jan. 2007.

Hsu et al., "Tube-Based Video Coding" Signal Processing Image Communication, Elsevier Science Publishers, Amsrerdam, NL, vol. 9, No. 3, Mar. 1, 1997, pp. 249-266, XP004057105.

International Preliminary Report on Patentability and English Translation of the Written Opinion dated Mar. 24, 2010 for corresponding International Application No. PCT/FR2008/051126, filed Jun. 23, 2008.

* cited by examiner

METHODS AND DEVICES FOR CODING AND DECODING AN IMAGE SEQUENCE REPRESENTED WITH THE AID OF MOTION TUBES, CORRESPONDING COMPUTER PROGRAM PRODUCTS AND SIGNAL

CROSS-REFERENCE TO RELATED APPLICATIONS

This Application is a Section 371 National Stage Application of International Application No. PCT/FR2008/051126, filed Jun. 23, 2008 and published as WO 2009/007580 on Jan. 15, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the coding and decoding of image sequences.

More precisely, the disclosure relates to the processing of sequences of video images or of bidimensional or tridimensional scenes (or ones exhibiting a higher number of dimensions), represented with the aid of motion tubes.

BACKGROUND OF THE DISCLOSURE

Current video coders, such as developed for example in the AVC H.264/MPEG-4 standard ("Advanced Video Coding") of the ITU ("International Telecommunication Union") presented in the document ISO/IEC 14496-10, make it possible to code an image sequence so as to deliver a coded sequence, compressed with respect to the source image sequence.

Accordingly, these coders use a discontinuous representation of the video sequence. More precisely, the images of the sequence are sliced up into blocks of pixels, a block of pixels corresponding to a grouping of adjacent pixels. These coders are based on a processing of the information contained in these blocks which involves a transformation step, a quantization step and an entropy coding step. Thus, each block is coded by intra-image or inter-image prediction.

A drawback of these prior art techniques is that the blocks in each image are defined independently of the blocks of the other images of the sequence. This gives rise to a discontinuous representation of the motion in the sequence, and therefore a poor representation of the real motion and cost overheads in terms of compression bitrate.

Alternative techniques, based on meshes for example, have thus been proposed, offering a continuous representation of the motion.

However, a drawback of these mesh based techniques is that the motions between the regions are constrained, and therefore do not make it possible to represent the breaks in the motion field that may arise in the image sequence (for example due to the appearances or to the disappearances of objects), between two regions having different motions.

Moreover, another drawback of these techniques stems from the use of irregular meshes, for which the structure of the mesh cells over the course of time must be transmitted. Indeed, this transmission of additional information gives rise to penalties in terms of compression performance.

There therefore exists a requirement for new techniques for coding/decoding images making it possible to at least partly alleviate the drawbacks of the prior art.

SUMMARY

An aspect of the disclosure relates to a method for decoding a signal representative of an image sequence.

According to an embodiment of the invention, such a method comprises the following steps:

extracting motion tubes from said signal, a tube comprising a block of pixels that may possibly evolve independently of at least one other tube, two tubes possibly, at a given instant, allocating different values to one and the same pixel of one of said images, each of said tubes being defined by at least the following information cues:

a block of reference pixels comprising reference texture information cues;

start-of-tube and end-of-tube instants;

transition information cues, making it possible to update said reference block at least one instant t of said sequence;

processing said transition information cues, delivering a current block for each of said tubes in a current image at an instant t;

combining the information cues associated with the current blocks of at least two of said tubes overlapping in an overlap zone of said current image, so as to reconstruct pixels which are optimized in said overlap zone.

Thus, an embodiment of the invention relies on a novel and inventive approach to the decoding of an image sequence, represented in the form of motion tubes.

More precisely, a motion tube corresponds to a block of pixels evolving over the course of time. Over the course of this evolution, the tube can deform, for example so as to take into account the apparent motion, or else if the number of pixels present in the block increases or decreases. This tube can also be refined, for example by passing to the sub-pixel level of the block.

Thus, the various motion tubes can evolve independently of one another. An image sequence is then represented by a set of motion tubes moving in space over the course of time, following the motion trajectories of the sequence. This "temporal persistence" of the tubes makes it possible to represent the video sequence in a continuous manner. Moreover, this representation makes it possible to effectively represent at one and the same time the zones of continuity and discontinuity of the motion of a sequence.

It is recalled that conversely, in the prior art block prediction coding techniques, the blocks in each image are defined independently of the blocks of the other images of the sequence. There is therefore no tracking in these predictions.

In particular, on the decoding side, according to an embodiment of the invention the motion tubes are extracted from the signal received, so as to process the transition information cues for these tubes, and to reconstruct for each tube a current block, potentially deformed, in the image that one seeks to reconstruct.

The information cues associated with the current blocks corresponding to overlapping tubes are thereafter combined so as to reconstruct the pixels situated in the overlap zone. In particular, the expression overlap zone is understood to mean a zone in which the current blocks associated with the tubes have pixels in common.

In particular, the block of pixels at the start instant of a tube, called the starting block, can correspond directly to the block of reference pixels defining said tube, or else be obtained on the basis of a modification of said block of reference pixels. Such a modification corresponds for example to a coding including a geometric transformation (homographic transformation, affine transformation, rotation, etc).

According to a particular embodiment of the invention, the combining step comprises, for at least one pixel of the overlap zone, an operation of calculating a mean of the texture value allotted to the pixel in each of said overlapping tubes.

In particular, this mean can be weighted, as a function of at least one of the criteria belonging to the group comprising:
- a depth information cue associated with each of said tubes;
- a priority information cue associated with each of said tubes;
- the instant of creation and/or the duration of each of said tubes;
- a position information cue for the pixel considered in each of said tubes;
- an information cue relating to a type of tube of each of said tubes.

Stated otherwise, pixels that are optimized in an overlap zone are determined on the basis of a combination (linear, geometric, etc) of the texture values allotted to the pixels in each of said overlapping tubes.

According to a specific aspect of an embodiment of the invention, the extraction step delivers tubes of different types, comprising in particular base tubes and refinement tubes intended to improve the restitution of at least one base tube.

The evolutions of the refinement tubes can be free with respect to the evolution of the base tubes.

In particular, the refinement tubes comprise:
- additive tubes, an additive tube comprising residual information cues intended to be added to the information cues of a base tube; and
- description tubes, a description tube comprising description information cues delivering a second description complementary and/or redundant to a first description provided by information cues of a base tube. For example, the first description makes it possible to describe the even pixels of a block and the second description makes it possible to describe the odd pixels.

According to this embodiment, the invention thus finds applications in scalable data coding and decoding, exhibiting adaptable quality and variable spatio-temporal resolution.

According to an implementation variant aimed at carrying out a scalable representation utilizing the correlations between the base tubes and the refinement tubes of additive type, it is considered that a refinement tube of additive type is related to the base tube that it details. Consequently, the temporal evolution of the refinement tube of additive type is dependent on the temporal evolution of the base tube.

According to a particular characteristic of an embodiment of the invention, the transition information cues defining a motion tube comprise:
- information cues regarding modification of position and/or displacement of the block in said current image; and
- information cues regarding modification of said texture.

These transition information cues make it possible in particular to reconstruct the current block in the current image, by taking account of the modifications that it has undergone with respect to a previously decoded image. For example, these modifications correspond to an update from image to image, to a coding by spatial and/or temporal transformation, etc.

For example, the transition information cues comprise information cues regarding deformation of the block implementing at least one of the operations belonging to the group comprising:
- a homographic transformation;
- an affine transformation;
- a rotation;

this operation being performed during the processing step by taking account of the deformation information cues.

According to a particular embodiment of the invention, the decoding method comprises a step of creating and updating a list of reference tubes. This step of creating the list can be performed for the first image of the sequence.

According to a particular characteristic of an embodiment of the invention, the extraction step comprises a step of reading, at an instant t, for each of the tubes at least one of the following information cues:
- an indication of use or non-use of said tube;
- an indication of use or non-use of a prediction for said tube;
- an information cue regarding position of said tube in the image;
- an information cue relating to a type of tube;
- texture data.

For example, the decoding method comprises the following steps:
- reading the information cues defining the reference tubes (block of reference pixels, instant of start and of end of tube, transition information cues);
- for each reference tube:
    - reading an indication of use or non-use of said reference tube for the reconstruction of a current image,
    - reading an information cue regarding modification of the texture and modification of position and/or displacement of said reference tube, and
    - updating said list of reference tubes;
- for each block of the current image:
    - reading an indication of use or non-use of a motion tube based prediction;
    - reading an indication of creation or non-creation of a new tube, and
    - if necessary, reading the information cues defining said new tube;
- reading the information cues regarding updating of the reference list of tubes;
- reconstructing the current image.

Another embodiment of the invention relates to a device for decoding a signal representative of an image sequence.

According to an embodiment of the invention, such a device comprises:
- means for extracting motion tubes from said signal, a tube comprising a block of pixels that may possibly evolve independently of at least one other tube,
- means for processing said transition information cues, delivering a current block for each of said tubes in a current image at an instant t;
- means for combining the information cues associated with the current blocks of at least two of said tubes overlapping in an overlap zone of said current image, so as to reconstruct pixels which are optimized in said overlap zone.

Such a decoding device is in particular suitable for implementing the decoding method described above. It involves for example a video decoder of H.264 or amended H.264 type.

Another aspect of the an embodiment of invention also relates to a computer program product downloadable from a communication network and/or recorded on a medium readable by computer and/or executable by a processor, comprising program code instructions for the implementation of the decoding method described above.

Another embodiment of the invention relates to a method for coding an image sequence.

According to an embodiment of the invention, such a coding method comprises the following steps:

inserting motion tubes into a signal representative of said sequence, a tube comprising a block of pixels that may possibly evolve independently of at least one other tube, two tubes possibly, at a given instant, allocating different values to one and the same pixel of one of said images, each of said tubes being defined by at least the following information cues:
  a block of reference pixels comprising reference texture information cues;
  start-of-tube and end-of-tube instants;
  transition information cues, making it possible to update said reference block at least one instant t of said sequence;
generating the transition information cues defining said motion tubes;

so as to allow, on decoding, the combining of the information cues associated with the current blocks of at least two of said tubes overlapping in an overlap zone of a current image, so as to reconstruct pixels that are optimized in the overlap zone.

Such a coding method is in particular suitable for coding an image sequence intended to be decoded according to the decoding method described above.

In particular, such a coding method comprises two main phases:

a phase of establishing the motion tubes, making it possible to construct said tubes on the basis of said information cues, and a phase of coding said motion tubes.

According to a particular embodiment of the invention:
the establishing phase comprises the following steps:
obtaining a list of reference motion tubes;
for each reference tube:
  determining an information cue regarding position of said reference tube in an image to be coded of said sequence,
  determining an indication of use or non-use of said reference tube; and
  updating the texture information cues;
for each block of the image to be coded:
  determining an indication of use or non-use of a motion tube based prediction for the reconstruction of said block;
and the coding phase comprises the following steps:
coding said list of reference motion tubes;
for each reference tube:
  coding said indication of use or non-use of said reference tube;
  coding the information cues regarding modification of texture and modification of position and/or displacement if this reference tube is used;
for each block of the image to be coded:
  coding the indication of use or non-use of a prediction with the aid of at least one motion tube;
  coding the creation or non-creation of a new tube on the basis of this block;
  coding the information cues regarding updating of said reference list.

Another embodiment relates to a device for coding an image sequence.

Such a device comprises:
means for inserting motion tubes into a signal representative of said sequence, a tube comprising a block of pixels that may possibly evolve independently of at least one other tube,
means for generating the transition information cues defining said motion tubes;

so as to allow, on decoding, the combining of the information cues associated with the current blocks of at least two of said tubes overlapping in an overlap zone of a current image, so as to reconstruct pixels that are optimized in the overlap zone.

Such a coding device is in particular suitable for implementing the coding method described above. It involves for example a video coder of H.264 or amended H.264 type.

Another embodiment of the invention also relates to a computer program product downloadable from a communication network and/or recorded on a medium readable by computer and/or executable by a processor, comprising program code instructions for the implementation of the coding method described above.

Yet another embodiment of the invention relates to a signal representative of an image sequence.

Such a signal comprises motion tubes, a tube comprising a block of pixels that may possibly evolve independently of at least one other tube,
two tubes possibly, at a given instant, allocating different values to one and the same pixel of one of said images,
each of said tubes being defined by at least the following information cues:
  a block of reference pixels comprising reference texture information cues;
  start-of-tube and end-of-tube instants;
  transition information cues, making it possible to update said reference block at least one instant t of said sequence;
said signal comprising transition information cues associated with each of said motion tubes,
so as to allow, on decoding, the combining of the information cues associated with the current blocks of at least two of said tubes overlapping in an overlap zone of a current image, so as to reconstruct pixels that are optimized in the overlap zone.

Such a signal can in particular represent a data stream coded according to the coding method described above. This signal may of course possibly comprise the various characteristics relating to the coding method according to an embodiment of the invention.

BRIEF DESCRIPTION OF THE DRAWINGS

Other characteristics and advantages will be more clearly apparent on reading the following description of a particular embodiment, given by way of simple illustrative and nonlimiting example, and the appended drawings, among which.

DETAILED DESCRIPTION OF ILLUSTRATIVE EMBODIMENTS

1. General Principle

The general principle of an embodiment of the invention relies on the coding and the decoding of a 2D or 3D image sequence represented with the aid of motion tubes.

Figure 1:
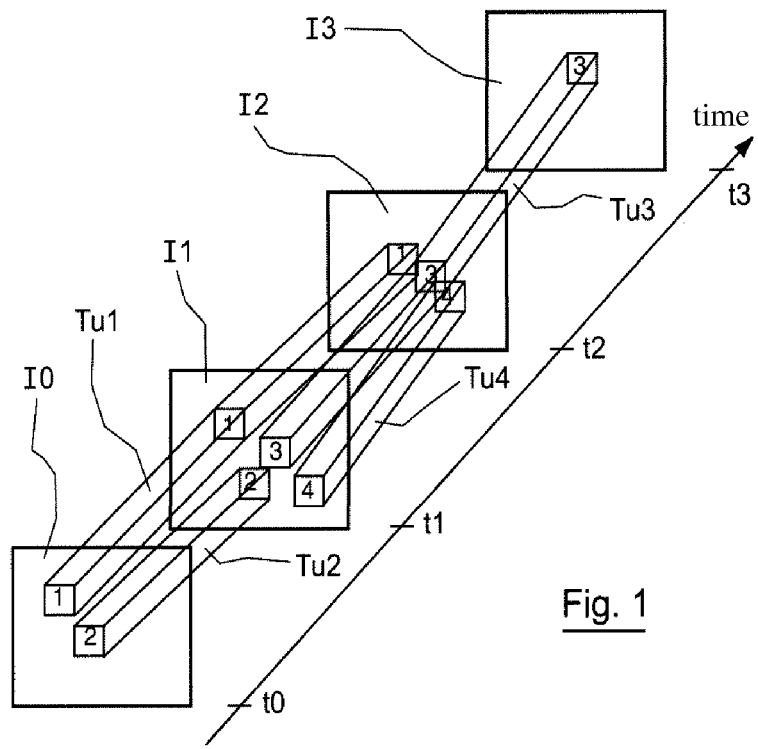
FIG. 1 illustrates an exemplary representation of an image sequence with the aid of motion tubes.

An exemplary representation of a video sequence by motion tubes is presented in relation to FIG. 1.

Four motion tubes Tu1, Tu2, Tu3 and Tu4, extending between the images I0, I1, I2 and I3, corresponding respectively to the instants t0, t1, t2 and t3 of the video sequence are considered according to this example.

More precisely, a motion tube is defined as a set of pixels (square, rectangular block, or cube in 3D for example) and its characteristics are:

- an instant of creation, or start-of-tube instant,
- an instant of disappearance, or end-of-tube instant,
- a set of positions (xt,yt) or of displacements (dxt,dyt) dependent on time t, t lying between the instant of creation and the instant of disappearance of the tube,
- a texture optionally varying over time.

For example, tube Tu1 is created at the instant t0, and disappears at the instant t2. This signifies that before the instant t0, tube Tu1 does not exist, and that after the instant t2, tube Tu1 no longer exists. Likewise tube Tu2 is created at the instant t0, and disappears at the instant t1, tube Tu3 is created at the instant t1, and disappears at the instant t3, and tube Tu4 is created at the instant t1, and disappears at the instant t2. Moreover, each tube comprises its own texture values.

Stated otherwise, if the image I0 is for example considered, tube Tu1 corresponds to block 1 of pixels of the image I0, to which a "temporal extension" t is applied, for t varying from t0 to t2.

Thus, the tubes are therefore not reinitialized at each instant, but "survive" through the images. In particular, a motion tube may be defined for non-consecutive images of an image sequence. For example, if a tube "disappears" from an image at an instant t, it remains in memory and may "reappear" at the instant t+1.

These tubes are used decoding side to reconstruct the images of the sequence. For example, tube Tu1 makes it possible to carry out the predictions on the images I1 and I2.

It may also be noted that the blocks of pixels associated with the various tubes can evolve independently of one another. Thus, the tubes can overlap, as for example tubes Tu3 and Tu4 at the instant t2 in FIG. 1, this not being possible with the mesh based techniques.

It may also be noted that the temporal evolution of the tubes is not confined to a translation. The blocks of pixels may undergo geometric transformations for each image, including the first image, such as for example a rotation, an affine transformation, or else a homographic transformation.

Figure 2:
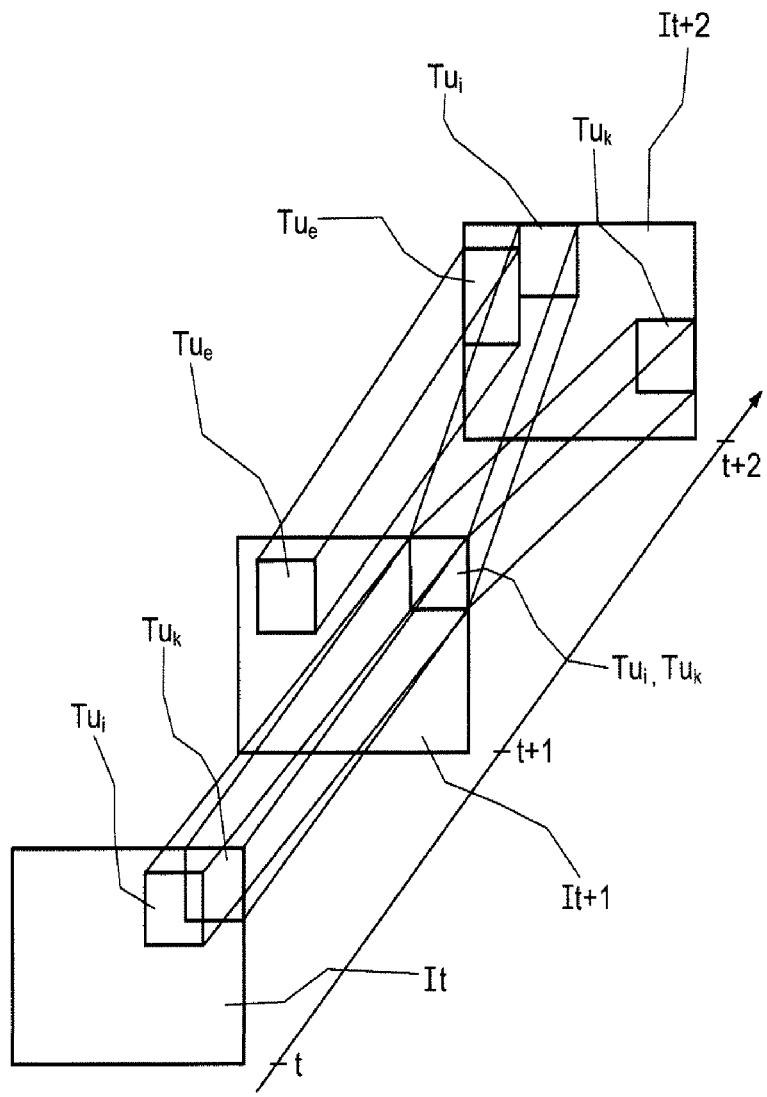
FIG. 2 presents the evolutions of a block in a motion tube over the course of time.

FIG. 2 illustrates more precisely the overlapping of various tubes. For example, tubes $Tu_j$ and $Tu_k$ are initialized in the image It at time t. At time t+1, tubes $Tu_j$ and $Tu_k$ may entirely overlap in the image It+1. Stated otherwise, tubes $Tu_j$ and $Tu_k$ then correspond to the same block of pixels. This arises for example when a part of an object, which part is associated with the block of pixels of tube $Tu_j$, is occulted by another object, associated with block $Tu_k$. Thereafter, on account of the independent evolution of the tubes, each tube $Tu_j$ or $Tu_k$ may depart in a different direction, according to the displacement of the object associated with each of the tubes.

A motion tube can also deform over the course of time (extension from translational motions to rotational motions, affine deformation, homographic deformation, etc). For example, for FIG. 2, tube $Tu_1$ initiated in image It+1 at the instant t+1, and disappearing in image It+2 at the instant t+2, is considered. The block of pixels corresponding to tube $Tu_1$ in the image It+2 may be different from the block of pixels corresponding to the same tube $Tu_1$ in the image It+1. For example, tube $Tu_1$ corresponds to a block of 8×8 pixels in the image It+1, and to a block of 12×8 pixels in the image It+2. In this case, the set of pixels making up the tube varies over the course of time. In order to represent the pixels of the block corresponding to tube $Tu_i$ in the image It+2, a deformation of the block containing the values of the modified pixels defined initially for the image It+1 can be implemented. Such a deformation implements for example an operation of homographic transformation, affine transformation, rotation type, etc.

Thus, a video sequence is represented by a set of motion tubes moving in space over the course of time, following the motion trajectories of the sequence.

2. Decoding

Figure 3:
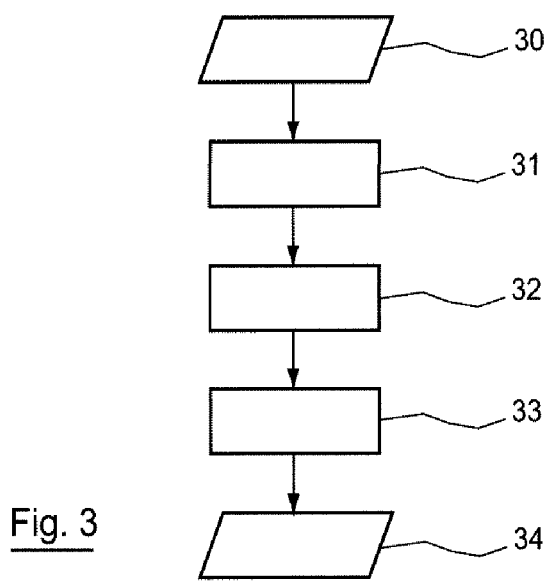
FIG. 3 presents the main steps of the decoding method according to an embodiment of the invention.

The main steps of the decoding method according to an embodiment of the invention are presented more precisely with regard to FIG. 3.

Accordingly, a signal 30 representative of an image sequence received by a decoder is considered.

The decoding method comprises first of all an extraction step 31 for extracting, from the signal 30, motion tubes each associated with a block of pixels. It is considered according to an embodiment of the invention that the tubes may evolve independently of one another. It is also considered that two tubes may, at a given instant, allocate different texture values to one and the same pixel of an image.

Each of the tubes is then defined by at least the following information cues:

- a block of reference pixels comprising reference texture information cues;
- start-of-tube and end-of-tube instants;
- transition information cues, making it possible to update said reference block at least one instant t of said sequence.

The block of pixels at the start instant of a tube, called the starting block, may correspond to the block of reference pixels defining said tube, or may be obtained on the basis of a modification of said block of reference pixels. This starting block does not therefore necessarily belong to an image of the sequence, but may originate from a storage memory, a database, etc.

It is also specified that the block of reference pixels (or the block of pixels at the start instant of a tube) may be different from one motion tube to another.

For example, in the image I1 of FIG. 1, the block of pixels at the start instant of tube Tu3 is the block 3, and the block of pixels at the start instant of tube Tu4 is the block 4.

It is also specified that the start instant of a tube may be different from one motion tube to another. For example, tube Tu1 has a start instant t0 and tube Tu3 has a start instant t1.

These transition information cues comprise in particular information cues regarding position modification and/or displacement of the block in the current image, and information cues regarding modification of the texture.

In the course of a step 32 of processing the transition information cues, the decoding method delivers a current block for each of the tubes in a current image at an instant t. For example, if it is sought to reconstruct the image I2 (denoted current image), block 3 of tube Tu3 in the image I2 is updated at the instant t2 by taking account of block 3 in the image I1 at the instant t1 and of the transition information cues associated with this tube Tu3. Stated otherwise, the starting block may evolve over the course of time, taking account of the transition information cues. One then speaks of a current block.

The decoding method thereafter comprises a step 33 of combining the information cues associated with the current blocks of at least two of said tubes overlapping in an overlap zone of a current image, so as to reconstruct pixels which are optimized in said overlap zone.

If FIG. 1 is considered again, it is noted for example that tubes Tu3 and Tu4 overlap in the image I2. A mechanism for managing the overlaps is then put in place, based on combining the information cues associated with tubes Tu3 and Tu4 (texture information cues in particular). The mechanism for managing the overlaps then makes it possible to define what is the reconstructed value for the image pixels situated in the overlap zone.

The decoding method then delivers a reconstructed image sequence 34.

Figure 4:
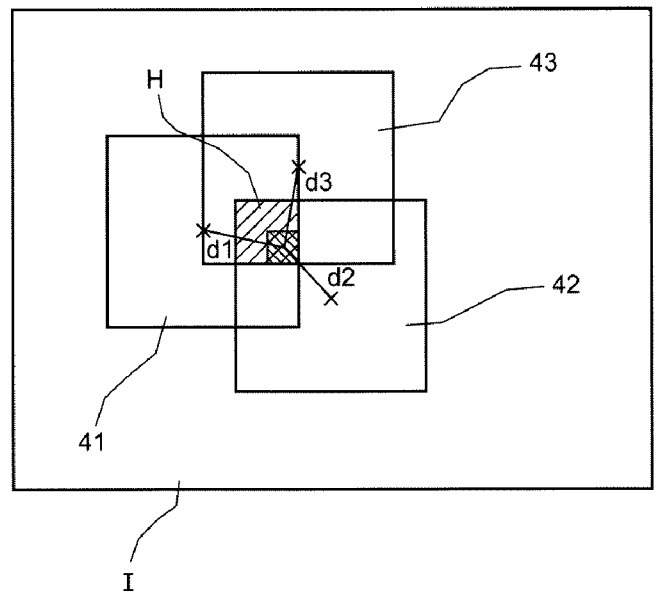
FIG. 4 illustrates the mechanism for managing the overlaps.

Step 33 of combining the information cues for various motion tubes is more precisely illustrated with regard to FIG. 4.

An image I is considered for example at a given instant, comprising three motion tubes each associated with a block of pixels. For the sake of simplification, the same notation is used for the block and the corresponding tube. In FIG. 4, the three tubes 41, 42 and 43 overlap in the hatched overlap zone denoted H.

Various techniques can be implemented for managing this overlap zone H.

For example, the combining step 33 implements an operation of calculating a mean of the texture value allotted to each pixel of the overlap zone H, in each of the overlapping tubes, so as to reconstruct the pixels of the overlap zone. Thus, if a pixel P of the zone H bears the value 210 in block 41, 230 in block 42, and 240 in block 43, the reconstructed pixel will bear the value 226

$$\left(\text{with } 226 = \frac{210 + 230 + 240}{3}\right).$$

It is also conceivable to weight this mean, by weighting the various motion tubes. For example, a priority information cue can be associated with each of the tubes. This priority information cue can correspond to a quality information cue. In this case, only the texture value associated with the tube bearing the largest priority information cue will be taken into account.

The priority information cue can also correspond to a depth information cue. In this case, it is possible to take account solely of the texture value associated with the tube bearing the largest depth information cue. It is also possible to combine the texture values associated with all the overlapping tubes by weighting these values by the depth associated with each tube.

According to another variant, it is also possible to take account of the texture value associated with a single one of the overlapping tubes: for example, only the longest (in duration) tube is considered, that is to say the tube defined over the largest number of consecutive or non-consecutive images, or else only the most recent tube is considered, that is to say the tube whose instant of creation is temporally closest. It is also possible to combine the texture values associated with all the overlapping tubes by weighting these values by the temporal duration (difference between the end instant and the instant of creation) of each tube or else by a decreasing (or inverse) monotonic function of the temporal distance with respect to the instant of creation of each tube (difference between the current instant and the instant of creation).

Yet another technique relies on taking account of the position of the pixel considered in each of the tubes. For example, a pixel P of the overlap zone H is situated at the distance d1 from the center of tube 41, at the distance d2 from the center of tube 42, and at the distance d3 from the center of tube 43. It is then possible to take account solely of the texture value associated with the tube closest to the pixel to be reconstructed, for example tube 42 if considering d2<d1 and d2<d3. It is also possible to weight the pixels of the overlapping tubes with respect to their position in the tube.

In another embodiment, it may be noted that the extraction step 31 delivers different tube types: either base tubes, or refinement tubes. These refinement tubes make it possible in particular to improve the restitution of the base tubes.

According to this embodiment the invention thus finds applications in scalable data coding and decoding, exhibiting adaptable quality and variable spatio-temporal resolution.

According to this embodiment the invention also finds applications in the robust coding and decoding of data.

In this embodiment, the management of the overlap zone H makes it possible to add the information cues of the refinement tube to those of the base tube, during the combining step 33.

More precisely, the refinement tubes can be of two types:
additive tubes, allowing a refinement in quality of a base tube, and comprising values of residuals. In this case, the combining of the information cues of the base tube and of the restitution information cues of the refinement tube is an addition;
descriptive tubes, comprising description information cues delivering a second description complementary and/or redundant to a first description provided by information cues of a reference tube. For example, the first description makes it possible to describe the even pixels of a block and the second description makes it possible to describe the odd pixels. In this case, the combining of the information cues of the base tube and of the refinement tube can be a weighting of the information cues of the base tube and of the information cues of the refinement tube. It is also possible to take account solely of the information cues of the base tube or of the information cues of the refinement tube.

In this case it is considered that a base tube and the refinement tube (or tubes) which details it are related, and that their temporal evolutions are dependent.

An exemplary algorithm for the implementation of the decoding method for decoding a signal representative of an image sequence is described hereinafter:
reading of an information cue defining a list of reference tubes, or block of reference pixels, in particular if this phase is implemented coder side;
for each reference tube:
reading of an indication of use or non-use of this reference tube for the reconstruction of a current image;
if this tube is used:
reading of the transition information cues associated with the tube used, that is to say information cues regarding modification of the texture and modification of position and/or displacement of the block,
updating of the transition information cues associated with the tubes (i.e. updating of the texture and of the position and/or displacement);

for each block of the current image:
  reading of an indication of use or non-use of a motion tube based prediction;
  reading of an indication of creation or non-creation of a new tube;
  if a new tube has to be created, reading of the information cues defining the new motion tube,
  reading of the information cues regarding updating of the reference list of the tubes;
  reconstruction of the current image.

The reconstruction of the current image is thus carried out by combining the predictions arising from the various motion tubes. Each tube thus defines a prediction $\tilde{B}_t(x, y, t)$, obtained by motion compensation and optionally interpolation of the texture of this tube at the point (x,y) and at the instant t.

For example, and as illustrated with regard to FIG. 4, these various predictions are combined as follows:

$$I(x, y, t) = \sum_{i \in base\ tube} w_i \tilde{B}_i(x, y, t) + \sum_{i \in refinement\ tube} w_j \tilde{B}_j(x, y, t)$$

The weights $w_i$ and $w_j$ are introduced so as to take into account the weightings to be applied during multiple predictions.

Thus, according to a first variant, these weights can be defined by: w=1/{number of predictions at this point}

According to a second variant, each tube defines a weight $w_t$ related to the position of the point with respect to the tube (for example weight inversely proportional to the distance from the center of this tube) and then $w_i$ is defined as $w_t$ divided by the sum of the various $w_t$.

According to a third variant, the combining of the predictions of the tubes to obtain the final prediction can call upon operations other than weighting operations, using for example techniques arising from multiple description coding.

3. Coding

Figure 5:
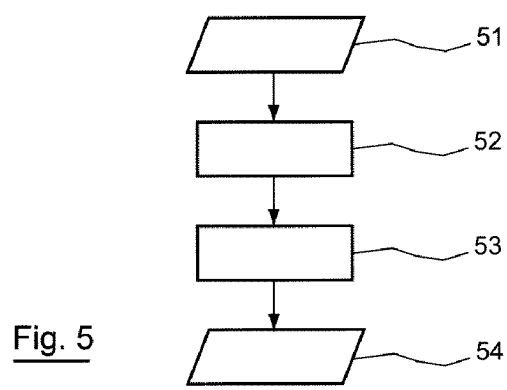
FIG. 5 presents the main steps of the coding method according to an embodiment of the invention.

The main steps of the coding method according to an embodiment of the invention are henceforth presented with regard to FIG. 5.

More precisely, an image sequence 51 that one desires to code, is considered coding side.

In the course of a first insertion step 52, motion tubes, such as defined above, are inserted into a signal representative of the sequence.

More precisely, each of the motion tubes is defined by at least the following information cues:
  a block of reference pixels comprising reference texture information cues;
  start-of-tube and end-of-tube instants;
  transition information cues, making it possible to update said reference block at least one instant t of said sequence.

In the course of a following generating step 53, the transition information cues defining the motion tubes are generated. Stated otherwise, for each motion tube the evolutions of the block of reference pixels over the course of time is defined.

A signal 54 is thus generated, representative of the image sequence 51, comprising motion tubes, and allowing, on decoding, a combining of the information cues associated with the current blocks of at least two of the tubes overlapping in an overlap zone of a current image, so as to reconstruct pixels that are optimized in the overlap zone.

An exemplary algorithm for the implementation of the coding method for coding an image video sequence is described hereinafter. Such an algorithm comprises two main phases: a phase of establishing the tubes, and a phase of coding the tubes.

A) Phase of Establishing the Tubes:

Firstly, a video sequence is decomposed into a set of motion tubes.

For the first image of a sequence, a motion tube is initialized for each block of a set of blocks covering the first image. This set of blocks covering the first image may comprise disjoint blocks only, that is to say ones which have no pixels in common, or else blocks that are partly superimposed, that is to say at least two blocks comprise a common pixel. The slicing considered is then redundant, thereby making it possible for example to effect multiple descriptions for one and the same content, or else to better estimate the motion in the boundary zones of objects.

These motion tubes make it possible to define a list of reference tubes.

The coding of an image to be coded is then considered, a list of images or of blocks of reference pixels that are known (for example already coded/decoded and stored in cache memory), as well as a list of reference tubes being given beforehand.

The phase of establishing the motion tubes for the implementation of the coding method comprises the following steps:
  for each tube in the list of reference tubes:
    determining a position information cue for the tube in the image to be coded of the sequence. Stated otherwise, the position that this tube would have in the image to be coded is sought for example by searching for the position translation which would lead to the best prediction for the image to be coded;
    determining an indication of use or non-use of the reference tube, by using for example a technique of thresholding on the prediction of the tube;
    updating the texture information cues, by defining for example a residual to be added to the texture values defined in the tube at a reference instant;
  for each block of the image to be coded:
    determining an indication of use or non-use of a motion tube based prediction for the reconstruction of the block:
      if a block of the image to be coded is not coded with the aid of the predictions arising from the reference tubes, then the texture values of this block in the image to be coded are coded and it is associated with a new tube which will supplement the list of reference tubes on completion of the coding of the current image;
      if a block of the image is reconstructed on the basis of the predictions of the reference tubes, either one decides not to code anything any more, or one decides to initiate a refinement tube on this block (that is to say an additive tube comprising values of residuals to be added, or a description tube comprising values representative of the block).

B) Phase of Coding the Tubes:

In order to code the various tubes, a scheme of intra-residual type is used according to this algorithm for implementing the coding:
  during the creation of a tube, the values of the pixels of the block considered in the image are coded by a conventional block-wise coding technique, for example by reusing an intra-coding mode defined in the H.264 coding scheme for a block of size 4×4, 8×8 or 16×16;

during the updating of the texture of a reference tube, a residual to be added to the values of the block of reference pixels is coded, for example by reusing a residuals coding mode defined in the H.264 coding scheme for a block of size 4×4, 8×8 or 16×16;

the transition information cues (position of the reference tubes in particular) are coded for each new image to be coded, for example by using a block motion information cue coding technique as used in the H.264 coding scheme.

The following procedure is therefore obtained for the coding of an image:

coding of the list of reference tubes that is used, if such a list has been created. This step can be omitted by using the list pre-established in the codings of previous images;

for each reference tube:
  coding of the indication of use or non-use of the reference tube for the current image;
  if this tube is used: coding of the information cues regarding modification of the texture and modification of position and/or displacement;

for each block of the image to be coded:
  coding of the indication of use or non-use of a prediction with the aid of at least one motion tube;
  coding of the creation or non-creation of a new tube on the basis of this block;
  if a new tube is created,
    coding of the type of the new tube,
    coding of its values of texture, if the new tube is a description tube, or of residual, if the new tube is an additive tube.

coding of the information cues regarding updating of the reference tube list, for example by deleting the tubes for which the instant of disappearance has been reached.

4. Structures of the Coder and of the Decoder

Finally, the simplified structures of a coding device and of a decoding device implementing respectively a coding technique and a decoding technique such as are described above are presented with regard to FIGS. 6A and 6B.

Figure 6A:
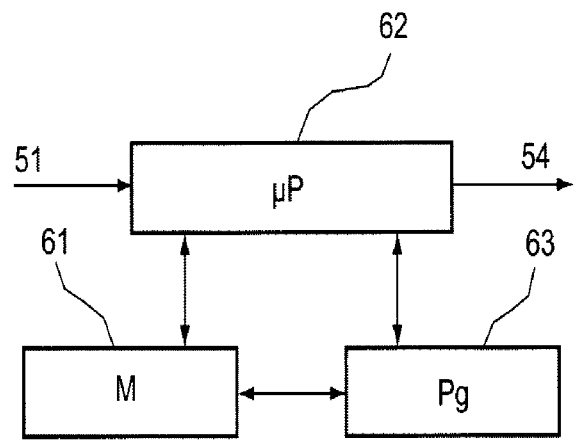
FIGS. 6A and 6B present the structure of a coding device and of a decoding device according to a particular embodiment of the invention.

A coding device such as illustrated in FIG. 6A comprises a memory 61 consisting of a buffer memory, a processing unit 62, equipped for example with a microprocessor μP, and driven by the computer program 63, implementing the coding method according to an embodiment of the invention.

On initialization, the code instructions of the computer program 63 are for example loaded into a RAM memory before being executed by the processor of the processing unit 62. The processing unit 62 receives as input an image sequence 51 to be coded. The microprocessor of the processing unit 62 implements the steps of the coding method described above, according to the instructions of the computer program 63, so as to code the image sequence represented by motion tubes. For this purpose, the coding device comprises, in addition to the buffer memory 61, means for inserting motion tubes, and means for generating transition information cues defining the motion tubes. These means are driven by the microprocessor of the processing unit 62.

The processing unit 62 delivers as output a signal 54 representative of the image sequence, comprising motion tubes.

Figure 6B:
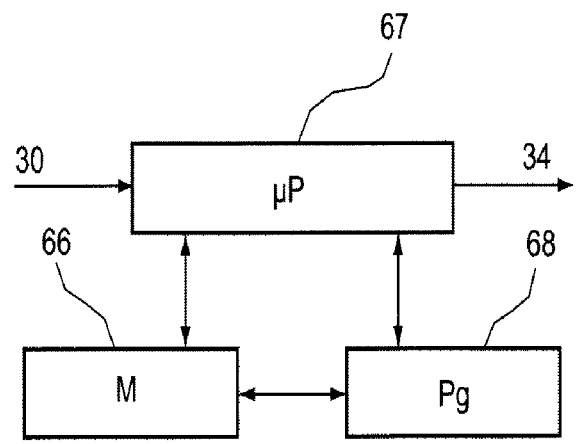

A decoding device such as illustrated in FIG. 6B comprises a memory 66 consisting of a buffer memory, a processing unit 67, equipped for example with a microprocessor μP, and driven by the computer program 68, implementing the decoding method according to an embodiment of the invention.

On initialization, the code instructions of the computer program 68 are for example loaded into a RAM memory before being executed by the processor of the processing unit 67. The processing unit 67 receives as input a signal 30 representative of an image sequence comprising motion tubes. The microprocessor of the processing unit 67 implements the steps of the decoding method described above, according to the instructions of the computer program 68, so as to reconstruct the images of the sequence. For this purpose, the decoding device comprises, in addition to the buffer memory 66, means for extracting motion tubes from the signal 30, means for processing transition information cues, and means for combining the information cues associated with the current blocks of at least two of said overlapping tubes. These means are driven by the microprocessor of the processing unit 67.

The processing unit 67 delivers a reconstructed image sequence 34.

Although the present disclosure has been described with reference to one or more examples, workers skilled in the art will recognize that changes may be made in form and detail without departing from the scope of the disclosure and/or the appended or issued claims thereof.

The invention claimed is:

1. A method for decoding a signal representative of an image sequence, wherein the method comprises the following steps:

extracting motion tubes from said signal with a decoding device, each motion tube comprising a block of pixels capable of evolving independently of at least one other motion tube, two motion tubes possibly, at a given instant, allocating different values to one and the same pixel of one of said images, each of said motion tubes being defined by at least the following information cues:
  a block of reference pixels comprising reference texture information cues;
  start-of-tube and end-of-tube instants delimiting a period of time over at least three images for at least one motion tube of said motion tubes;
  transition information cues, enabling said reference block to be updated at at least one instant t of said sequence;

so that at least one of said motion tubes corresponds to a block of pixels evolving over a course of a time period delimited by said start-of-tube and end-of-tube instants over at least three images;

processing said transition information cues, delivering a current block for each of said motion tubes in a current image at an instant t;

combining the information cues associated with the current blocks of at least two of said motion tubes capable of evolving independently of each other over at least the three images and overlapping in an overlap zone of said current image, so as to reconstruct pixels which are optimized in said overlap zone.

2. The decoding method as claimed in claim 1, wherein said combining step comprises, for at least one pixel of said overlap zone, an operation of calculating a mean of the texture value allotted to said pixel in each of said overlapping motion tubes.

3. The decoding method as claimed in claim 2, wherein said mean is a weighted mean, as a function of at least one of the criteria belonging to the group comprising:
  a depth information cue associated with each of said motion tubes;

a priority information cue associated with each of said motion tubes;

the instant of creation and/or the duration of each of said motion tubes;

a position information cue for the pixel considered in each of said motion tubes;

an information cue relating to a type of tube of each of said motion tubes.

4. The decoding method as claimed in claim 1, wherein the block of pixels at the start instant of a motion tube, called a starting block, corresponds to the block of reference pixels defining said motion tube, or is obtained on the basis of a modification of said block of reference pixels.

5. The decoding method as claimed in claim 1, wherein said extracting step delivers base tubes and refinement tubes intended to improve the restitution of at least one base tube.

6. The decoding method as claimed in claim 5, wherein said refinement tubes comprise additive tubes and description tubes, an additive tube comprising residual information cues intended to be added to the information cues of a base tube, and a description tube comprising description information cues delivering a second description complementary and/or redundant to a first description provided by information cues of a base tube.

7. The decoding method as claimed in claim 1, wherein said transition information cues comprise:

information cues regarding modification of position and/or displacement of said block in said current image; and information cues regarding modification of said texture.

8. The decoding method as claimed in claim 7, wherein said transition information cues comprise information cues regarding deformation of said block implementing at least one of the operations belonging to the group comprising:

a homographic transformation;

an affine transformation;

a rotation;

and wherein said processing step performs said operation as a function of said deformation information cues.

9. The decoding method as claimed in claim 1, wherein said extracting step comprises a step of reading, at an instant t, for each of said motion tubes at least one of the following information cues:

an indication of use or non-use of said motion tube;

an indication of use or non-use of a prediction for said motion tube;

an information cue regarding position of said motion tube in the image;

an information cue relating to a type of motion tube;

texture data.

10. A device for decoding a signal representative of an image sequence, wherein the device comprises:

means for extracting motion tubes from said signal, each motion tube comprising a block of pixels capable of evolving independently of at least one other motion tube, two motion tubes possibly, at a given instant, allocating different values to one and the same pixel of one of said images, each of said motion tubes being defined by at least the following information cues:

a block of reference pixels comprising reference texture information cues;

start-of-tube and end-of-tube instants delimiting a period of time over at least three images for at least one motion tube of said motion tubes;

transition information cues, enabling said reference block to be updated at at least one instant t of said sequence;

so that at least one of said motion tubes corresponds to a block of pixels evolving over a course of a time period delimited by said start-of-tube and end-of-tube instants over at least three images;

means for processing said transition information cues, delivering a current block for each of said motion tubes in a current image at an instant t;

means for combining the information cues associated with the current blocks of at least two of said motion tubes capable of evolving independently of each other over at least the three images and overlapping in an overlap zone of said current image, so as to reconstruct pixels which are optimized in said overlap zone.

11. A non-transitory medium readable by computer and comprising a computer program product recorded thereon, said computer program product comprising program code instructions for implementing a method for decoding a signal representative of an image sequence when executed by a processor, wherein the method comprises the following steps:

extracting motion tubes from said signal, each motion tube comprising a block of pixels that capable of evolving independently of at least one other motion tube, two motion tubes possibly, at a given instant, allocating different values to one and the same pixel of one of said images, each of said motion tubes being defined by at least the following information cues:

a block of reference pixels comprising reference texture information cues;

start-of-tube and end-of-tube instants delimiting a period of time over at least three images for at least one motion tube of said motion tubes;

transition information cues, enabling said reference block to be updated at at least one instant t of said sequence;

so that at least one of said motion tubes corresponds to a block of pixels evolving over a course of a time period delimited by said start-of-tube and end-of-tube instants over at least three images;

processing said transition information cues, delivering a current block for each of said motion tubes in a current image at an instant t; and combining the information cues associated with the current blocks of at least two of said motion tubes capable of evolving independently of each other over at least the three images and overlapping in an overlap zone of said current image, so as to reconstruct pixels which are optimized in said overlap zone.

12. A method for coding an image sequence, wherein the method comprises the following steps:

inserting motion tubes into a signal representative of said sequence with a coding device, each motion tube comprising a block of pixels capable of evolving independently of at least one other motion tube, two motion tubes possibly, at a given instant, allocating different values to one and the same pixel of one of said images, each of said motion tubes being defined by at least the following information cues:

a block of reference pixels comprising reference texture information cues;

start-of-tube and end-of-tube instants delimiting a period of time over at least three images for at least one motion tube of said motion tubes; and transition information cues, enabling said reference block to be updated at at least one instant t of said sequence;

so that at least one of said motion tubes corresponds to a block of pixels evolving over a course of a time period delimited by said start-of-tube and end-of-tube instants over at least three images; and generating the transition information cues defining said motion tubes;

so as to allow, on decoding, the combining of the information cues associated with the current blocks of at least two of said motion tubes capable of evolving independently of each other over at least the three images and overlapping in an overlap zone of a current image, so as to reconstruct pixels that are optimized in the overlap zone.

13. A device for coding an image sequence, wherein the device comprises:

means for inserting motion tubes into a signal representative of said sequence, each motion tube comprising a block of pixels capable of evolving independently of at least one other motion tube, two motion tubes possibly, at a given instant, allocating different values to one and the same pixel of one of said images, each of said motion tubes being defined by at least the following information cues:

a block of reference pixels comprising reference texture information cues;

start-of-tube and end-of-tube instants delimiting a period of time over at least three images for at least one motion tube of said motion tubes; and transition information cues, enabling said reference block to be updated at at least one instant t of said sequence;

so that at least one of said motion tubes corresponds to a block of pixels evolving over a course of a time period delimited by said start-of-tube and end-of-tube instants over at least three images; and means for generating the transition information cues defining said motion tubes;

so as to allow, on decoding, the combining of the information cues associated with the current blocks of at least two of said motion tubes capable of evolving independently of each other over at least the three images and overlapping in an overlap zone of a current image, so as to reconstruct pixels that are optimized in the overlap zone.

14. A non-transitory medium readable by computer and comprising a computer program product recorded thereon, said computer program product comprising program code instructions for implementing a method for coding an image sequence when executed by a processor, wherein the method comprises the following steps:

inserting motion tubes into a signal representative of said sequence, each motion tube comprising a block of pixels capable of evolving independently of at least one other motion tube, two motion tubes possibly, at a given instant, allocating different values to one and the same pixel of one of said images, each of said motion tubes being defined by at least the following information cues:

a block of reference pixels comprising reference texture information cues;

start-of-tube and end-of-tube instants delimiting a period of time over at least three images for at least one motion tube of said motion tubes; and transition information cues, enabling said reference block to be updated at at least one instant t of said sequence;

so that at least one of said motion tubes corresponds to a block of pixels evolving over a course of a time period delimited by said start-of-tube and end-of-tube instants over at least three images; and generating the transition information cues defining said motion tubes;

so as to allow, on decoding, the combining of the information cues associated with the current blocks of at least two of said motion tubes capable of evolving independently of each other over at least the three images and overlapping in an overlap zone of a current image, so as to reconstruct pixels that are optimized in the overlap zone.

15. A method comprising:

generating a signal representative of an image sequence, wherein the signal comprises motion tubes, each motion tube comprising a block of pixels capable of evolving independently of at least one other motion tube, two motion tubes possibly, at a given instant, allocating different values to one and the same pixel of one of said images, each of said motion tubes being defined by at least the following information cues:

a block of reference pixels comprising reference texture information cues;

start-of-tube and end-of-tube instants delimiting a period of time over at least three images for at least one motion tube of said motion tubes; and transition information cues, enabling said reference block to be updated at at least one instant t of said sequence;

so that at least one of said motion tubes corresponds to a block of pixels evolving over a course of a time period delimited by said start-of-tube and end-of-tube instants over at least three images; and said signal comprising transition information cues associated with each of said motion tubes, so as to allow, on decoding, the combining of the information cues associated with the current blocks of at least two of said motion tubes capable of evolving independently of each other over at least the three images and overlapping in an overlap zone of a current image, so as to reconstruct pixels that are optimized in the overlap zone; and delivering the signal as an output signal.

* * * * *

UNITED STATES PATENT AND TRADEMARK OFFICE
CERTIFICATE OF CORRECTION

PATENT NO.        : 8,588,292 B2                             Page 1 of 1
APPLICATION NO. : 12/666184
DATED             : November 19, 2013
INVENTOR(S)       : Pateux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 393 days.

Signed and Sealed this
Twenty-second Day of September, 2015

Michelle K. Lee
*Director of the United States Patent and Trademark Office*